US010748255B2

(12) United States Patent
Kajimura

(10) Patent No.: US 10,748,255 B2
(45) Date of Patent: Aug. 18, 2020

(54) IMAGE BLUR CORRECTION DEVICE, OPTICAL APPARATUS, AND CONTROL METHOD

(71) Applicant: CANON KABUSHIKI KAISHA, Tokyo (JP)

(72) Inventor: Fumihiro Kajimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 15/910,280

(22) Filed: Mar. 2, 2018

(65) Prior Publication Data

US 2018/0260939 A1 Sep. 13, 2018

(30) Foreign Application Priority Data

Mar. 9, 2017 (JP) ................. 2017-044967

(51) Int. Cl.
*G06T 5/00* (2006.01)
*H04N 5/232* (2006.01)
*G06T 5/10* (2006.01)

(52) U.S. Cl.
CPC .............. *G06T 5/003* (2013.01); *G06T 5/10* (2013.01); *H04N 5/23209* (2013.01); *H04N 5/23254* (2013.01); *H04N 5/23258* (2013.01); *H04N 5/23287* (2013.01); *G03B 2207/005* (2013.01); *G06T 2207/20024* (2013.01); *G06T 2207/20182* (2013.01)

(58) Field of Classification Search
CPC . G06T 5/003; G06T 2207/20024; G06T 5/10; H04N 5/23254; H04N 5/23287
See application file for complete search history.

(56) References Cited

U.S. PATENT DOCUMENTS

| 9,277,102 | B2 | 3/2016 | Kimura et al. | |
|---|---|---|---|---|
| 2003/0095189 | A1* | 5/2003 | Liu | H04N 5/23248 348/208.4 |
| 2013/0141599 | A1* | 6/2013 | Kimura | H04N 5/225 348/207.99 |
| 2017/0347032 | A1 | 11/2017 | Kajimura et al. | |

FOREIGN PATENT DOCUMENTS

JP 2013-118450 A 6/2013

\* cited by examiner

*Primary Examiner* — Ahmed A Berhan
(74) *Attorney, Agent, or Firm* — Carter, DeLuca & Farrell LLP

(57) ABSTRACT

An image blur correction device acquires a blur detection signal, and separates it into a high frequency band signal component and a low frequency band signal component using an HPF and an LPF. A high frequency side prediction processing unit acquires an output of the HPF, and a low frequency side prediction processing unit acquires an output of the LPF via a down-sampler. A prediction processing unit updates a filter coefficient of a prediction filter using an adaptive algorithm, and performs linear prediction on the blur detection signal. An adder adds an output of the high frequency side prediction processing unit to an output of the low frequency side prediction processing unit via an up-sampler, and outputs a superimposed output signal. Image blur correction control is performed on the basis of a superimposed output signal.

14 Claims, 11 Drawing Sheets

IMAGE BLUR CORRECTION DEVICE, OPTICAL APPARATUS, AND CONTROL METHOD

BACKGROUND OF THE INVENTION

Field of the Invention

The present invention relates to an image blur correction device, an optical apparatus, and a control method.

Description of the Related Art

An imaging apparatus with an image blur correction function has been proposed, which corrects image blur of a captured image generated due to influences such as shaking of the hand of a photographer. In an optical image blur correction, processing of detecting shaking of an imaging apparatus by, for example, a gyro sensor and the like, and of correcting image blur by causing a correction lens to shift in a direction substantially orthogonal to an optical axis based on a result of the detection is performed. In addition, as a blur detection method, there is a method of detecting a motion vector based on image signals continuously acquired by an imaging element. In this method, a motion vector is acquired and image blur correction is performed when necessary at the time of video photographing. However, since a motion vector cannot be detected during an exposure time at the time of still image photographing, image blur correction cannot be performed. In the imaging apparatus disclosed in Japanese Patent Laid-Open No. 2013-118450, linear prediction by an adaptive algorithm is performed using a blur signal up to immediately before still image exposure, and a blur signal for a certain time at the time of still image exposure is predicted.

In a conventional technology based on linear prediction, a blur signal at the time of still image exposure is predicted by updating a filter coefficient of a prediction filter according to an adaptive algorithm when necessary. In this case, if the time from the start time of acquiring a blur detection signal to the time of still image exposure is short, there is a problem that the prediction accuracy of a blur signal may decrease in the case in which the update time of the filter coefficient is not sufficient.

SUMMARY OF THE INVENTION

The present invention provides an image blur correction device which can increase accuracy in image blur correction based on a signal prediction using a prediction filter.

According to an aspect of the invention, an image blur correction device corrects a blur of an object image by using an image blur correction unit. The object image is imaged by an imaging unit through an imaging optical system. The image blur correction device comprises: a memory; and a processor operating in accordance with a program stored in the memory. The processor comprises: a bandwidth separation unit which acquires a detection signal of a blur by a detection unit and separates it into a plurality of frequency band components, a plurality of signal prediction units configured to each include a prediction filter, to update a filter coefficient using a signal whose band is separated by the bandwidth separation unit, and to perform prediction processing on the detection signal for each separated band, a superimposition unit configured to generate a superimposed output signal by superimposing output signals of the plurality of signal prediction units, and a control unit configured to control the plurality of signal prediction units and to control the image blur correction unit by calculating a blur amount based on the detection signal or the superimposed output signal. The control unit resets filter coefficients of the plurality of signal prediction units to initial values at different timings.

Further features of the present invention will become apparent from the following description of exemplary embodiments with reference to the attached drawings.

DESCRIPTION OF THE EMBODIMENTS

Hereinafter, embodiments of the present invention will be described in detail with reference to accompanying drawings. In each embodiment, an image blur correction device included in an imaging apparatus is described as an example; however, the present invention is not limited to a digital still camera, and can also be applied to digital video cameras, optical equipment such as an interchangeable lens, mobile phones into which cameras are built, various types of information processing devices and the like having an imaging function, or the like.

First Embodiment

Figure 1:
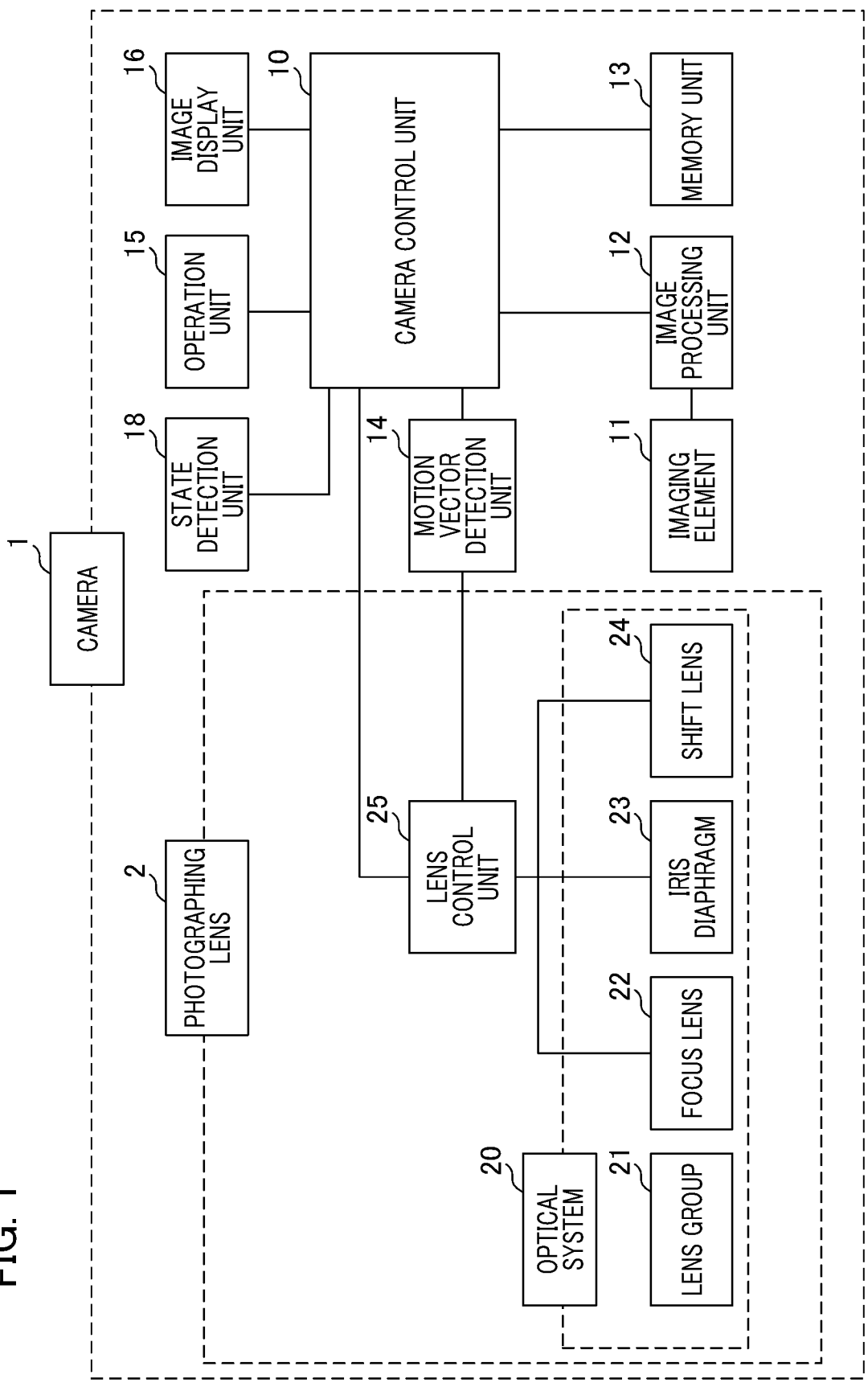
FIG. 1 is a block diagram which describes a configuration of an imaging apparatus of a first embodiment and a first modification.

An imaging apparatus according to a first embodiment will be described with reference to FIGS. 1 to 6. FIG. 1 is a block diagram which shows a main configuration example of a digital camera which is an example of an imaging apparatus. A digital camera 1 includes a photographing lens 2. The photographing lens 2 is an interchangeable lens which is attachable to a main body of the digital camera 1 or a lens portion which is provided integrally with the main body. A light ray which has passed through the photographing lens 2 is received by an imaging element 11. An electric signal photo-electrically converted by the imaging element 11 is processed by an image processing unit 12 and image data is generated. A memory unit 13 stores image data and the like in a storage medium.

A motion vector detection unit 14 detects a motion vector from data of a plurality of captured images. Shaking of an imaging apparatus can be detected by a motion vector, and the motion vector detection unit 14 outputs a motion vector as a blur detection signal to a camera control unit 10. The camera control unit 10 is a central unit which integrally controls an imaging system, and includes a central processing unit (CPU). The camera control unit 10 receives an operation instruction from a user from an operation unit 15 and controls operations of each unit. An image display unit 16 displays captured images and the like in accordance with a control signal of the camera control unit 10 on a screen. A state detection unit 18 which detects a camera state will be described below in a first modification.

An optical system of a photographing lens 2, that is, an imaging optical system 20, includes various types of lens groups and diaphragms. Light from an object passes through a lens group 21 and focus adjustment is performed by a movement of a focus lens 22. An iris diaphragm 23 is an optical member that performs exposure adjustment. A shift lens 24 is a movable lens which moves in a direction substantially orthogonal to an optical axis of the imaging optical system 20 and performs image blur correction for optically correcting an image blur of an object generated by shaking of the hand or the like.

A lens controller 25 controls each component of the photographing lens 2. For example, the lens controller 25 controls a focus adjustment operation by the focus lens 22, driving of the iris diaphragm 23, and an image blur correction operation by the shift lens 24. The lens controller 25 receives an output signal from the motion vector detection unit 14 and, at the same time, performs communication with the camera control unit 10. The lens controller 25 includes a CPU and executes signal prediction processing and image blur correction processing to be described below.

A light ray which has passed through the imaging optical system 20 in the photographing lens 2 is received by the imaging element 11, and photoelectric conversion is performed. With respect to an electric signal acquired by the photoelectric conversion, quantization processing is performed by an analog/digital (A/D) converter which is not shown. The image processing unit 12 includes a white balance adjustment circuit, a gamma correction circuit, an interpolation operation circuit, and the like therein. The image processing unit 12 receives a command of the camera control unit 10 and generates image data based on a signal acquired by the imaging element 11. Data generated by the image processing unit 12 is stored in the memory unit 13.

The camera control unit 10 generates a timing signal and the like and outputs them to each unit if a user performs an operation of a photographing instruction using the operation unit 15. The camera control unit 10 controls the imaging element 11 and transmits a command signal to the lens controller 25 if an operation instruction signal from a release switch included in the operation unit 15 is received.

Figure 2:
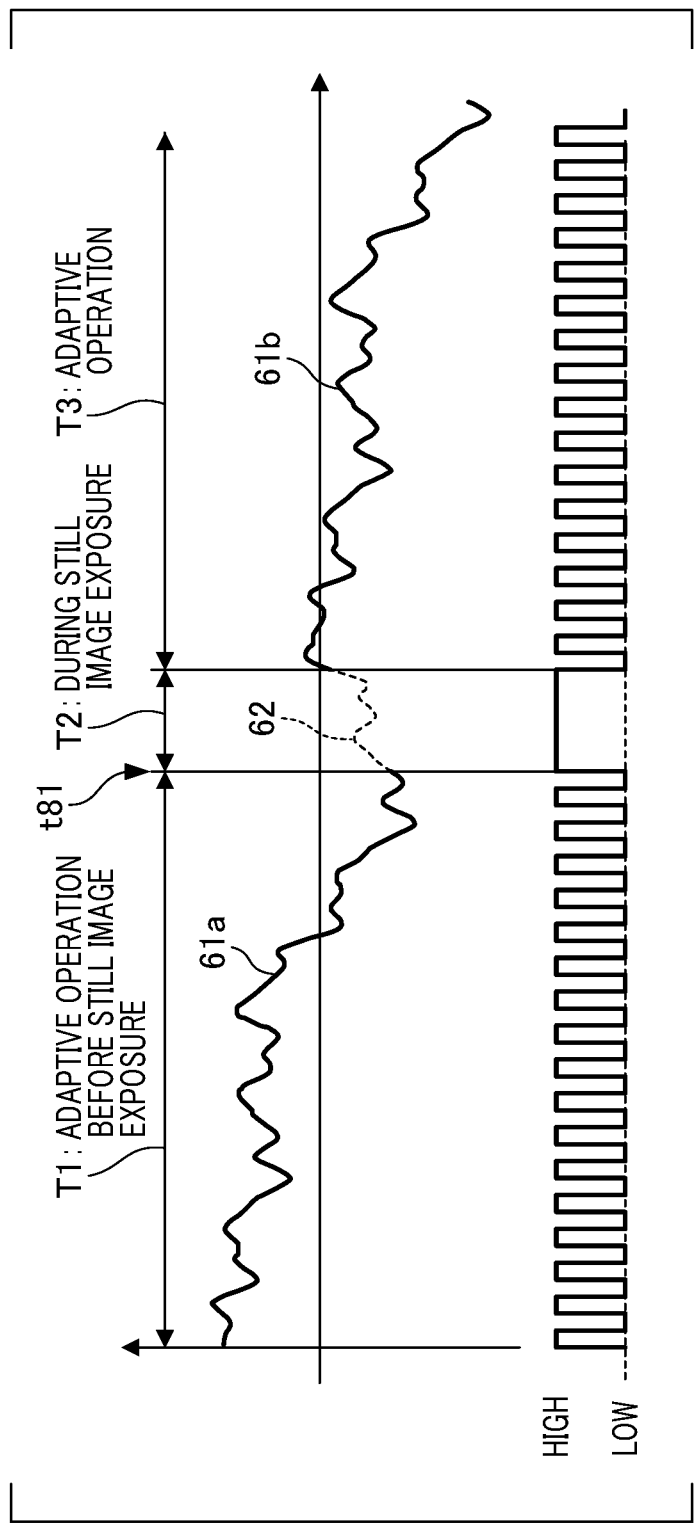
FIG. 2 is a schematic diagram which shows prediction processing by a blur signal.

Next, an outline of signal prediction processing of a blur signal at the time of still image exposure will be described with reference to FIG. 2. In a graph of FIG. 2, a horizontal axis represents a time axis and a vertical axis represents a blur amount. A period T1 indicates a period of an adaptive operation before still image exposure, and T2 indicates a period during still image exposure. T3 indicates a period of an adaptive operation after still image exposure. A thick solid line 61 represents a blur signal detected by the motion vector detection unit 14. A broken line 62 represents a blur signal used for correction by prediction processing. A signal indicated by the broken line 62 corresponds to a blur correction signal during still image exposure (the period T2). A timing chart shown on a lower side of the graph represents an exposure timing of the imaging element 11. "High" indicates that exposure is in progress, and "Low" indicates that exposure is stopped.

In the period T1 before still image exposure, short time exposure is continuously performed with a constant cycle and a motion vector is detected by the motion vector detection unit 14. Furthermore, updating of a prediction filter of a blur signal by a motion vector is performed. The prediction filter is a blur signal prediction unit. A cycle of the short time exposure is set to a cycle corresponding to 120 frames per second (FPS), 240 FPS, or the like. The period 2 starts from a timing t81 at which a photographer presses a release button included in the operation unit 15 and issues a still image photographing command to the camera control unit 10, and exposure of the imaging element 11 concerning still image photographing is performed. The period T2 is a predetermined period determined to have proper exposure. Since long time exposure for still image photographing is performed, it is not possible to acquire a motion vector in the period T2. Cyclic exposure using a short time is performed again in the period T3 after still image photographing ends.

The prediction filter performs linear prediction using an adaptive algorithm. The prediction filter in the period T1 predicts a blur signal acquired by occasional sampling. Then, a difference between a blur signal actually acquired at a next sampling time and a predicted blur signal is obtained, and processing for updating a filter coefficient of a prediction filter is performed. When the filter coefficient is updated, prediction accuracy of a blur signal increases. Hereinafter, this operation is referred to as an adaptive operation, and a period in which the adaptive operation is performed is referred to as an adaptive operation period. Details of the configuration and operations of an actual signal prediction unit will be described below.

In the adaptive operation in the period T1, if there is no significant change in frequency components of a blur signal, a filter coefficient value of the prediction filter converges such that prediction accuracy increases as the adaptive operation proceeds. Therefore, if the adaptive operation period is made longer to a certain extent, the filter coefficient value sufficiently converges and prediction accuracy of prediction processing becomes higher. Conversely, if the adaptive operation period is short, the prediction accuracy decreases. For example, if a blur signal with a frequency of 1 [Hz] is predicted, an adaptive operation period of 1 [sec] including one cycle corresponding to at least 1 [Hz] is required. Furthermore, if an adaptive operation period corresponding to several cycles is obtained, the prediction accuracy is improved.

However, there are some cases in which a sufficient adaptive operation period cannot be secured. For example, after an imaging apparatus is started up and starts to detect a blur, an adaptive operation may start and the camera control unit 10 may immediately receive a still image photographing command in some cases. In this case, if an adaptive operation period is not sufficient, the prediction accuracy of a blur signal may decrease. If a photographer performs a startup operation in a state of holding an imaging apparatus, and a still image photographing command is immediately issued, it is not possible to ensure a sufficient adaptive operation period from a start of the detection of a blur. In addition, an adaptive operation is performed again immediately after a still image exposure is performed, and thus continuous photographing and the like of a still image may be performed without providing a sufficient period after the adaptive operation starts again. If an adaptive operation period is sufficient, the prediction accuracy of a blur signal decreases.

Therefore, in the present embodiment, a blur signal acquired by the motion vector detection unit 14 is separated into a plurality of frequency band components. Specifically, a bandwidth separation unit separates each blur signal component into a high frequency band and a low frequency band. A signal prediction unit constituted by a linear prediction filter corresponding to a signal component of each separated band is used. That is, signal prediction processing is executed by using each of a high frequency band prediction filter and a low frequency band prediction filter. In a signal prediction unit of each frequency band, filter coefficients of the prediction filters are reset to initial values at different timings. Specifically, a filter coefficient of the high frequency band prediction filter is reset every hour at the time of the start of an adaptive operation. On the other hand, processing of recording a filter coefficient value at the time of a previous adaptive operation having been performed is performed on a filter coefficient of the low frequency band prediction filter. An adaptive operation is performed using a recorded filter coefficient value.

With regard to shaking of the hand, shaking in low frequency bands such as 0.1 to 3 Hz is a unique shaking for each photographer, and the frequency components change little. On the other hand, shaking in a high frequency band has frequency components of shaking which easily change according to a state of a photographer such as a standing posture and a method of setting up a camera. Therefore, in a low frequency band, an adaptive operation is performed using a previously recorded filter coefficient, assuming that there is no significant change in frequency components included. On the other hand, if there is a significant change in the frequency components, it may be better to start an adaptive operation after resetting a filter coefficient value to an initial value than to start an adaptive operation using a previous filter coefficient. The reason for this is that a filter coefficient value converges at a higher velocity and prediction accuracy becomes higher in a short time. In addition, since starting an adaptive operation immediately after resetting a filter coefficient value to an initial value has lower likelihood of divergence of a prediction signal, stability of prediction processing improves. Furthermore, since the time for acquiring blur signals of one cycle in a high frequency band is shorter than in a low frequency band, even if a prediction filter in the high frequency band is frequently reset, an adaptive operation period is more likely to be sufficient than in a prediction filter in the low frequency band.

Figure 3:
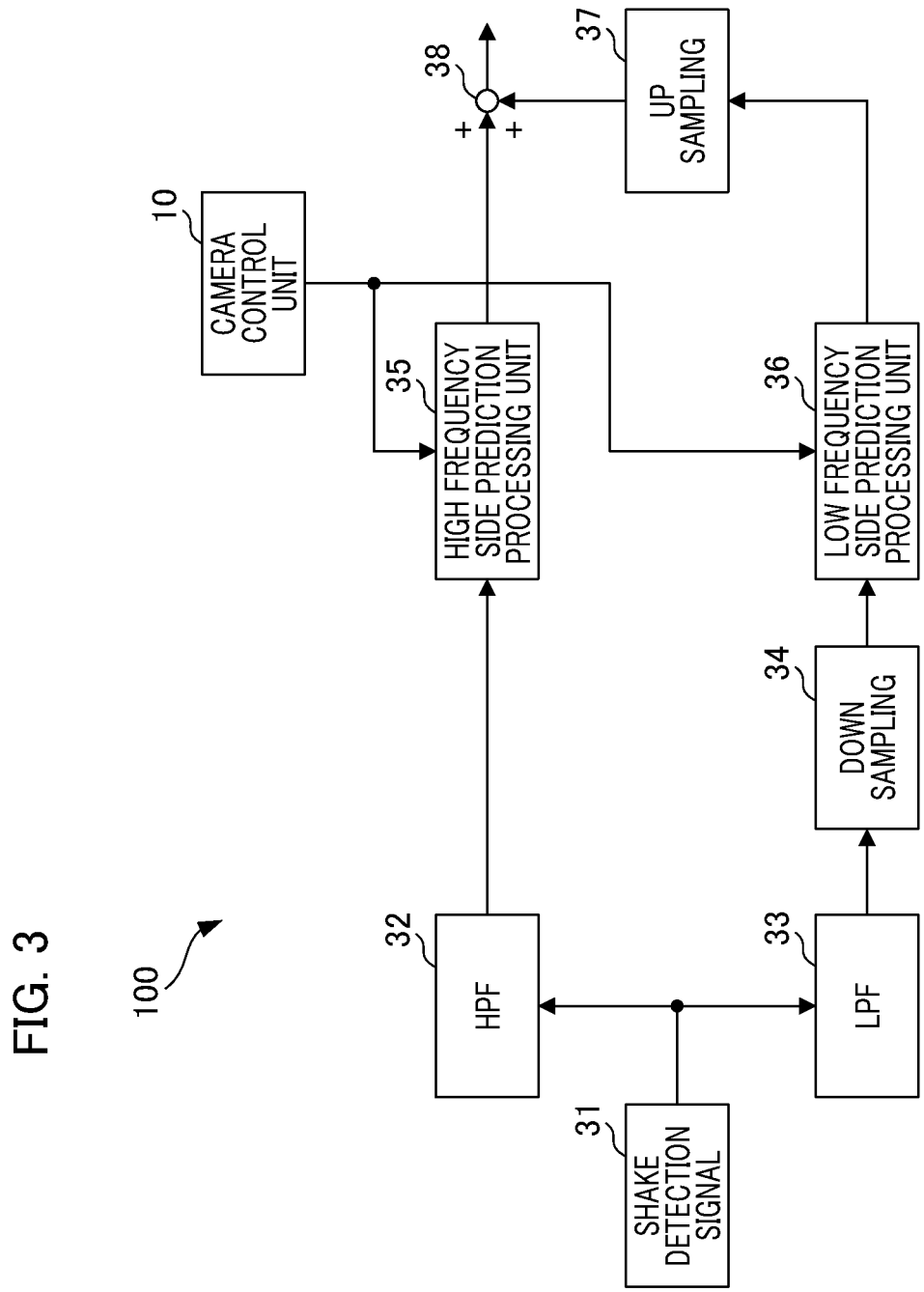
FIG. 3 is a block diagram which shows signal processing in the first embodiment.

Calculation processing of a blur signal used for correction will be described with reference to FIG. 3. FIG. 3 is a block diagram which shows a configuration example of a signal processing unit 100 that calculates a blur signal. The signal processing unit 100 is shown as a processing unit realized by the lens controller 25. The blur detection signal 31 from the motion vector detection unit 14 branches into two, one of which is input to a high-pass filter (hereinafter, referred to as HPF) 32, and the other is input to a low-pass filter (hereinafter, referred to as LPF) 33. The HPF 32 is a first bandwidth separation unit and extracts a high frequency component of a blur detection signal. The LPF 33 is a second bandwidth separation unit and extracts a low frequency component of a blur detection signal. The cutoff frequencies of the HPF 32 and the LPF 33 are set to the same value.

An output signal of the HPF 32 is acquired by a high frequency side prediction processing unit 35 to perform prediction processing. On the other hand, a down-sampler 34 serves to lower a sampling frequency of an output signal of the LPF 33. An output signal of the down-sampler 34 is acquired by a low frequency side prediction processing unit 36 and prediction processing is performed. An up-sampler 37 raises a sampling frequency of an output signal of the low frequency side prediction processing unit 36 and outputs the sampling frequency to an adder 38. The adder 38 adds and superimposes respective output signals of the high frequency side prediction processing unit 35 and the low frequency side prediction processing unit 36. The superimposed output signals arithmetically calculated by the adder 38 are sent to a blur correction drive unit, and an image blur correction operation is performed. The blur correction drive unit includes the shift lens 24 and a drive mechanism, and corrects an image blur by moving the shift lens 24 in a direction substantially orthogonal to the optical axis of the imaging optical system 20.

In the present embodiment, an example of separating a blur signal into a high frequency band blur signal component and a low frequency band blur signal component using an HPF 32 and the LPF 33 which are bandwidth separation units will be described. The high frequency side prediction processing unit 35 and the low frequency side prediction processing unit 36 are prediction filters with the same filter order and the like, and include separate filter coefficients. Since a high-frequency component is not included in a signal after the processing of the LPF 33, an amount of arithmetic calculation at the low frequency side prediction processing unit 36 is reduced by lowering a sampling frequency using the down-sampler 34. Processing of returning to an original sampling frequency is performed on a blur prediction signal on a low frequency side by the up-sampler 37 before the blur prediction signal on a low frequency side is added to a blur signal on a high frequency side by the adder 38. In the high frequency side prediction processing unit 35 and the low frequency side prediction processing unit 36, a timing of prediction processing and a reset operation of a filter coefficient are controlled by the camera control unit 10.

Figure 4:
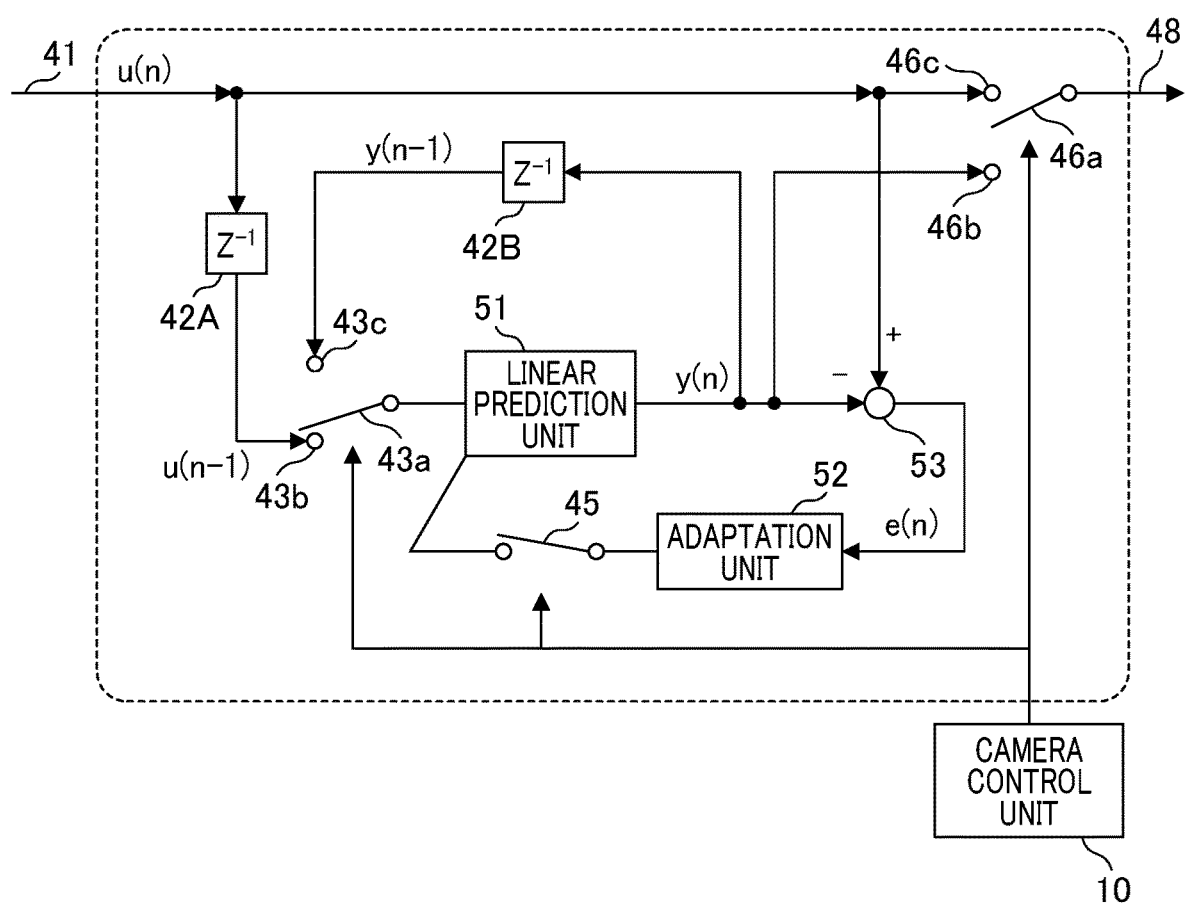
FIG. 4 is a block diagram which shows a signal prediction processing unit in the first embodiment.

Next, a switching operation of prediction processing by an adaptive algorithm of the prediction processing units 35 and 36 will be described with reference to FIG. 4. The high frequency side prediction processing unit 35 and the low frequency side prediction processing unit 36 have the same configuration, and an internal configuration is shown within a dotted line frame. The linear prediction unit 51 is constituted by a prediction filter. The filter coefficient of the prediction filter is updated in accordance with an output of the adaptation unit 52.

An input terminal 41 indicates an input terminal of the prediction processing unit 35 or 36, and an output terminal 48 indicates an output terminal of the prediction processing unit 35 or 36. U(n) which is input from the input terminal 41 indicates a value of a blur signal from the motion vector detection unit 14. Y(n) indicates a prediction signal value (predicted value) of the linear prediction unit 51, and e(n) indicates an error of linear prediction processing. For these values, n in parentheses is an $n^{th}$ sampling value. A signal of the input value u(n) of a blur signal branches into two; one of them is input to the unit delay device 42A and the other is input to a contact point 46c of the output switching unit 46. An output of the unit delay device 42A is input to a contact point 43b of a prediction unit input switching unit 43. y(n) is input to a contact point 43c of the prediction unit input switching unit 43 via a unit delay device 42B. An output of the adaptation unit 52 is input to the linear prediction unit 51 via an adaptive operation switch 45. An output of the linear prediction unit 51 branches into three. That is, y(n) is input to each of the unit delay device 42B, the subtractor 53, and the contact point 46b of the output switching unit 46. A signal selected by the output changeover switch 46a is output from the output terminal 48. A prediction unit input changeover switch 43a, the adaptive operation switch 45, and the output changeover switch 46a are controlled by a command signal from the camera control unit 10.

First, an operation before still image exposure will be described. The prediction unit input changeover switch 43a is in a state in which the contact point 43b is selected, and the adaptive operation switch 45 is in an ON state. The output changeover switch 46a is in a state in which the contact point 46c is selected.

An output of the prediction unit input switching unit 43 is u(n−1) obtained by delaying a signal of the input terminal 41 by a unit time. The unit time corresponds to a length of one sampling period. u(n−1) is input to the linear prediction unit 51 and the linear prediction unit 51 outputs a predicted value y(n) in accordance with the input value u(n−1). That is, processing of generating a current predicted value y(n) on the basis of u(n−1) one sample previously is executed. In the present specification, an operation of obtaining a current predicted value based on an observation value one or more samples previously is referred to as a prediction operation. The subtractor 53 calculates a difference between an acquired observation value u(n) and a predicted value y(n) acquired from the linear prediction unit 51. That is, "e(n) =u(n)−y(n)" is calculated and output to the adaptation unit 52 as a prediction processing error. The adaptation unit 52 updates a filter coefficient within the linear prediction unit 51 according to the adaptive algorithm using the prediction processing error e(n).

Before still image exposure, an output of the output switching unit 46 is the observation value u(n). That is, if a blur signal can be acquired from the motion vector detection unit 14 before still image photographing as shown in the period T1 of FIG. 2, a signal of the input terminal 41 is output to the output terminal 48 as it is, and an adaptive operation of the linear prediction unit 51 is performed by the adaptation unit 52. Details of the operations of the linear prediction unit and the adaptation unit will be described using FIG. 5A and FIG. 5B.

Next, a case in which a motion vector is not obtained during still image photographing exposure, that is, a case in which the observation value u(n) is not obtained from the input terminal 41, will be described. At this time, the prediction unit input changeover switch 43a is in a state in which the contact point 43c is selected, and the adaptive operation switch 45 is in an OFF state. The output changeover switch 46a is in a state in which the contact point 46b is selected.

The output of the prediction unit input switching unit 43 is a previous predicted value y(n−1), and is input to the linear prediction unit 51. The linear prediction unit 51 outputs a predicted value y(n) in accordance with the input value y(n−1). Since the adaptive operation switch 45 is in the OFF state, the adaptation unit 52 and the subtractor 53 stop operations. The output of the output switching unit 46 is a predicted value y(n). That is, a predicted value calculated according to a signal of the linear prediction unit 51 is output to the output terminal 48, and the adaptation unit 52 stops an operation during still image exposure.

In the present embodiment, the lens controller 25 needs to know in advance whether it is in a still image exposure period. For this reason, the camera control unit 10 transmits a timing signal of still image exposure to the lens controller 25 if a release button of the operation unit 15 is pressed and a still image photographing command is detected.

Figure 5A:
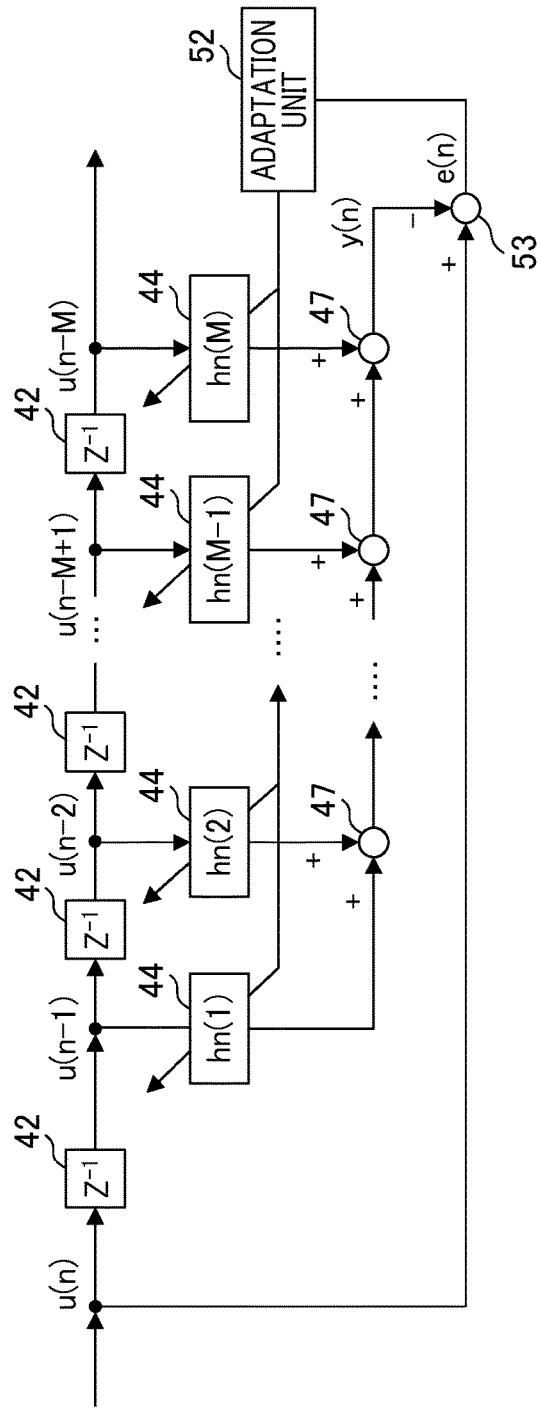
FIGS. 5A and 5B are block diagrams which show a linear prediction unit and an adaptation unit in the first embodiment.
Figure 5B:
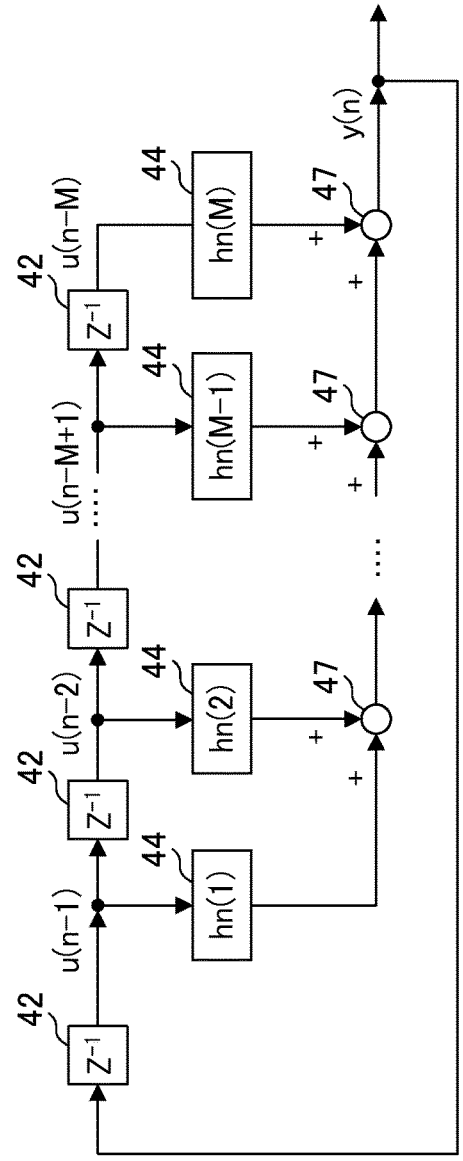

Next, detailed configurations and operations of the linear prediction unit 51 and the adaptation unit 52 will be described with reference to FIGS. 5A and 5B. FIG. 5A is a configuration diagram which describes an operation before still image exposure. FIG. 5B is a configuration diagram which describes an operation during still image exposure. In FIGS. 5A and 5B, only the linear prediction unit 51 and surrounding units thereof are illustrated, and the switching switch and the like shown in FIG. 4 are omitted.

In FIG. 5A, a plurality of unit delay units 42, a plurality of addition units 47, and M coefficient units 44 are shown. $h_n(1)$ to $h_n(M)$ indicate filter coefficients, respectively. A suffix n at the lower right of h indicates that it is a filter coefficient of an $n^{th}$ sample. u(n−1) to u(n−M) indicate respective outputs of the unit delay unit 42. A linear prediction unit illustrated in FIG. 5A is constituted by a so-called transversal filter. Other types of filter (lattice filters and the like) which can use the adaptive algorithm can be used, but the transversal filter will be described as an example in the following.

First, an adaptive operation will be described. The predicted value y(n) is output from the addition unit 47 of a final stage and becomes a negative input to the subtractor 53. In the case of the adaptive operation shown in FIG. 5A, a current predicted value y(n) is obtained by the following equation (1).

$$y(n) = \sum_{i=1}^{M} h_n(i)u(n-i) \quad (1)$$

M in Equation (1) represents an order of a filter and is set in accordance with a sampling frequency of a signal subjected to a prediction operation or an adaptive operation, a time for performing a prediction operation, and the like. Various algorithms (adaptive algorithm) for an adaptive operation are proposed. In the present specification, a least-mean-squares (LMS) algorithm will be described. The LMS algorithm is derived from a gradient method, and update processing of the filter coefficient $h_n$ is performed according to the following Equation (2).

$$h_{n+1}(i) = h_n(i) + \mu e(n)u(i) \ (i=1,2,K,M) \quad (2)$$

μ in Equation (2) is a positive coefficient referred to as a step size parameter. e(n) is a prediction processing error output to the adaptation unit 52 by the subtractor 53. According to the LMS algorithm, the filter coefficient $h_n$ approaches a minimum error value from an initial value using a steepest descent method. A sufficiently small prediction processing error e(n) means that the predicted value y(n) is a good approximate value of the observation value u(n). In this case, an amount to be updated by an adaptive operation is small.

Next, a prediction operation will be described. If a prediction operation is performed as shown in FIG. 5B, the predicted value y(n) is used instead of the observation value u(n). In an example of FIG. 5B, y(n−1) is used instead of u(n−1). On the other hand, since an observation value is used for previous samples, FIG. 5B shows a case in which an observation value is not appropriately obtained only for one sample. Since "u(n−1)≈y(n−1)" is achieved if the prediction processing error e(n) is sufficiently small due to an adaptive operation, it is expected that a predicted value y(n) obtained again by replacing with a predicted value for one sample will be a good approximate value. y(n) is used instead of u(n) in a next prediction. By sequentially repeating this processing, it is possible to predict not only one sample but also a section slightly longer than one sample. In this manner, by sequentially calculating a predicted value, it is possible to obtain a signal for blur correction during still image exposure.

In the present embodiment, each of a high frequency component and a low frequency component of a separated blur signal includes a prediction filter. The filter coefficient $h_n$ is recorded in a recording unit in the prediction filter. Even in the case in which a power supply of a camera is turned off, the filter coefficient $h_n$ is held. If a reset operation of each filter coefficient is performed by a command from the camera control unit 10, a filter coefficient value is returned to an initial value. For the initial value, for example, all values are 0, 1, or the like.

Figure 6:
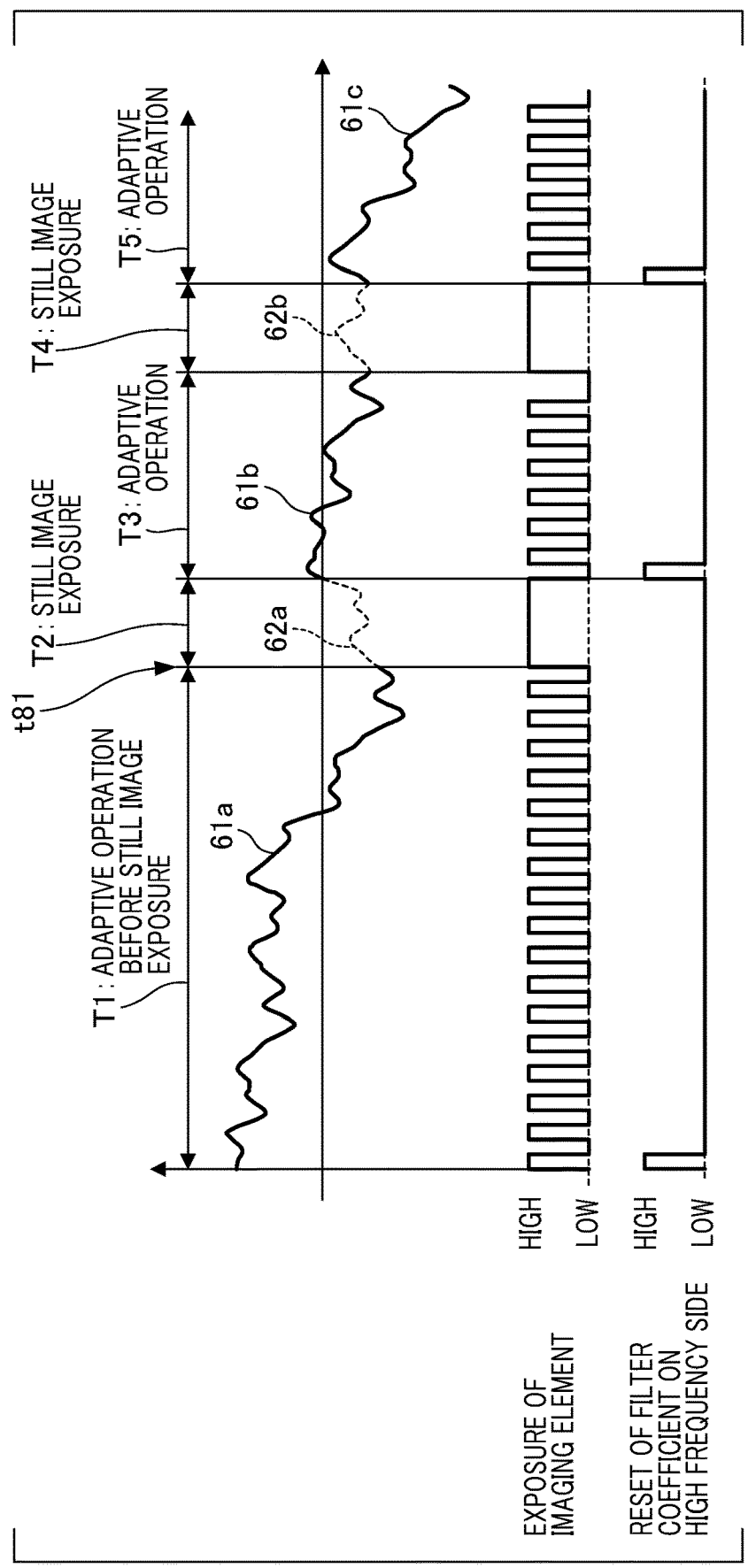
FIG. 6 is a schematic diagram which shows resetting of a blur signal and a prediction filter in the first embodiment.

Next, a timing of a reset operation of the filter coefficient of a prediction filter will be described with reference to FIG. 6. A graph of FIG. 6, in the same manner as in FIG. 2, is a diagram which shows a blur signal detected by the motion vector detection unit 14 and a blur correction signal of prediction processing. The horizontal axis is a time axis and the vertical axis represents a blur amount. The periods T1 to T3 are as described in FIG. 2. A period T4 is a still image exposure period after the period T3 elapses, and a period T5 is an adaptive operation period subsequently following the period T4. Solid lines 61a, 61b, and 61c represent blur signals of the motion vector detection unit 14, respectively. Broken lines 62a and 62b represent blur signals used for correction by prediction processing, respectively. Furthermore, timing charts shown on a lower side of the graph represent an exposure timing of the imaging element 11 and a reset timing of a filter coefficient on a high frequency side. In the timing chart of the reset timing, a reset operation of the filter coefficient of a prediction filter on a high frequency side is performed at a timing of "high".

First, the filter coefficient of a prediction filter on a high frequency side is reset at a first time point in the period T1 in which blur detection starts. In addition, a filer coefficient value at the time of the end of a previous camera operation is set for a prediction filter on a low frequency side. The prediction processing units 35 and 36 in the period T1 acquire a blur signal from the motion vector detection unit 14, perform an adaptive operation, and update values of each filter coefficient. Then, if a still image photographing command is issued from the camera control unit 10, still image exposure is performed in the period T2. The lens controller 25 performs image blur correction control using a blur correction signal 62a generated by a prediction filter. If still image exposure ends in the period T2, blur detection by the motion vector detection unit 14 is performed again in the period T3.

The filter coefficient of a prediction filter on a high frequency side is reset at a beginning of the period T3. On the other hand, the filter coefficient value is set for a prediction filter on a low frequency side, and an adaptive operation starts using the blur signal 61b. If a still image photographing command is issued by the camera control unit 10 again, a still image exposure operation and an image blur correction control using the blur correction signal 62b generated by a prediction filter are performed in the period T4.

After the period T4 elapses, the filter coefficient of a prediction filter on a high frequency side is reset at a beginning of the period T5 like the period T3, and the filter coefficient value is set for a prediction filter on a low frequency side, and thereby an adaptive operation starts again. Thereafter, if the power supply of a camera is turned off, processing of recording the filter coefficient of a prediction filter on a low frequency side in a recording medium is executed and then the processing ends.

For a prediction filter on a high frequency side, the filter coefficient is reset and an adaptive operation is started from the initial value, but since it is possible to obtain a frequency for several cycles even if an adaptive operation period is a short period like the period T3, prediction accuracy can be sufficiently secured. On the other hand, a prediction filter on a low frequency side performs an adaptive operation using a filter coefficient previously used, but since the frequency components of a blur signal in a low frequency band change little, it is possible to cause the filter coefficient value to converge fast.

In the present embodiment, a blur signal acquired before still image exposure is separated into a high frequency band signal component and a low frequency band signal component, and a blur correction signal during still image exposure is generated using a prediction filter according to an adaptive algorithm of a blur signal for each band. On the filter coefficient of a prediction filter in each frequency band, a reset operation is performed at the start time of blur detection and after the end of still image exposure, and the filter coefficient is set to an initial value in the case of the high frequency side. On the other hand, an adaptive operation starts using a previous filter coefficient value in the case of the low frequency side. Accordingly, even in the case in which the length of an adaptive operation period is short, prediction accuracy in still image exposure can be improved and image blur correction can be performed with high accuracy. According to the present embodiment, in an imaging apparatus which performs image blur correction at the time of still image photographing using a prediction filter, image blur correction can be performed with high accuracy even in a case in which an update time of a filter coefficient is not sufficient.

First Modification

A timing of a reset operation of the filter coefficient on a high frequency side is not limited to the start time of blur detection or after the end of still image exposure, and, for example, a reset operation may be performed at the following timing in a first modification.

With regard to frequency components included in shaking of the hand, in a state in which a photographer maintains the same behavior like in continuous photographing, and the like, a high frequency component does not change greatly. On the other hand, the frequency components easily change if a photographer changes a photographing direction of a camera or changes a state of the camera from horizontal position photographing to vertical position photographing, if a photographer changes a gripping state of a camera to gripping with both hands or gripping with one hand, or the like. Besides, like with a zoom state of a photographing lens and the like, if a state of an imaging optical system is changed and a state of a camera changes, the frequency component may change. Therefore, the state detection unit 18 (FIG. 1) which detects a change in photographing state by a photographer or in state of a camera due to a zoom operation of a lens or the like is provided in the first modification.

The state detection unit 18 includes, for example, an acceleration sensor to detect a change in positional posture such as a vertical position and a horizontal position of a camera, or a change in state such as a standing position and a sitting position of a photographer. In addition, the state detection unit 18 includes a touch sensor disposed on an exterior member of a camera, and detects a change in gripping state of the camera with respect to a photographer. The state detection unit 18 is connected to the camera control unit 10 and outputs a detection signal to the camera control unit 10 if a change of state is detected.

If a relative position change and the like of a camera are detected by the state detection unit 18, the camera control unit 10 performs a reset operation of the filter coefficient of the high frequency side prediction filter. If the state detection unit 18 does not detect a change of state of a camera, a filter coefficient value of a prediction filter previously used is recorded, and an adaptive operation is started using this value. The filter coefficient of the low frequency side prediction filter may be set to an initial value by performing a reset operation thereon based on a detection signal of the state detection unit 18. For example, if the state detection unit 18 detects a change of state from a state in which a photographer photographs in a standing posture to a state of a crouching and sitting posture, the camera control unit 10 performs a reset operation of the filter coefficient of the low frequency side prediction filter. In addition, if the camera control unit 10 determines that a predetermined time (a threshold time for determination) has elapsed since the power supply of a camera was previously turned off, a first filter coefficient at the start of blur detection is reset for both prediction filters on a low frequency side and a high frequency side.

Second Modification

In a second modification, an interchangeable lens type imaging system in which a lens device can be mounted on a camera main body having an imaging element will be described. In the case of the interchangeable lens type, both the camera control unit 10 in the camera main body and the lens controller 25 in the lens device may generate a blur correction signal. If the lens controller 25 mainly performs blur correction control, blur signal information from a motion vector from the camera control unit 10 and timing information of a still image photographing command are acquired via a communication unit. On the other hand, if the camera control unit 10 mainly performs blur correction control, a calculated blur correction signal is transmitted to the lens controller 25 via the communication unit.

The state detection unit 18 provided in the camera main body may detect whether a lens device is mounted on a camera main body. That is, if the state detection unit 18 detects a change of state in the case in which a user performs lens exchange, the camera control unit 10 rests the filter coefficient of a prediction filter if it is determined that a lens device has been exchanged. If the weight and length of the lens device is greatly changed due to lens exchange, the frequency component of a blur signal on a low frequency side may change. The camera control unit 10 resets not only the filter coefficient of the high frequency side prediction filter but also the filter coefficient of the low frequency side prediction filter.

The shift lens 24 included in the photographing lens 2 is an example of the image blur correction unit, and has a method of translatably driving a correction lens in a substantially perpendicular direction to an optical axis. As other methods, there are, for example, a method of translatably driving the imaging element 11 to an optical axis, a method of rotatably driving an entire photographing lens, and the like. These methods can be applied to other embodiments and modifications.

Third Modification

In a third modification, the length of an adaptive operation period of a prediction filter is compared with a predetermined threshold time, and if the length of an adaptive operation period is shorter than the threshold time, prediction processing by the high frequency side prediction filter is not performed. For example, if the camera control unit 10 determines that a still image exposure time from the start time of blur detection is too short and the length of an adaptive operation period of the high frequency side prediction processing unit 35 is not sufficient, control is performed as follows. If it is determined that the length of an adaptive operation period is shorter than a threshold time set in advance, the camera control unit 10 performs control such that there is no output from the high frequency side prediction processing unit 35 to the adder 38, or sets an output value to zero. Then, blur correction control is performed only on a predicted blur signal of the low frequency side prediction processing unit 36 which has performed an adaptive operation using a previous filter coefficient. As a result, if an adaptive operation period is not sufficient, it is possible to prevent image blur correction from being performed in a state in which a prediction error is large.

Second Embodiment

Next, a second embodiment will be described with reference to FIGS. 7 to 9. A configuration example in which a gyro sensor (angular velocity sensor) is used as a blur detection unit will be described in the present embodiment. In the present embodiment, components the same as in the first embodiment are denoted by the reference numerals which have already been used, and detailed description of these will therefore be omitted and differences will be mainly described. This manner of omitting such description will be the same in embodiments to be described below.

In the present embodiment, a camera with a focal plane shutter (hereinafter, simply referred to as a shutter) acquires a blur signal using a gyro sensor and performs image blur correction. The shutter is driven to control a still image exposure time, but vibration is generated by shutter driving. In particular, in an imaging apparatus including a gyro sensor (hereinafter, referred to as a gyro), the vibration at the time of shutter driving may generate noise with respect to a signal of the gyro, and this can cause a decrease in blur correction accuracy at the time of still image photographing. Therefore, an adaptive operation by a prediction filter is performed using a blur signal using the gyro before still image exposure in the present embodiment. If a still image photographing command is issued, image blur correction is performed using a blur prediction signal in a period in which there is an influence of noise on the gyro caused by shutter driving.

Figure 7:
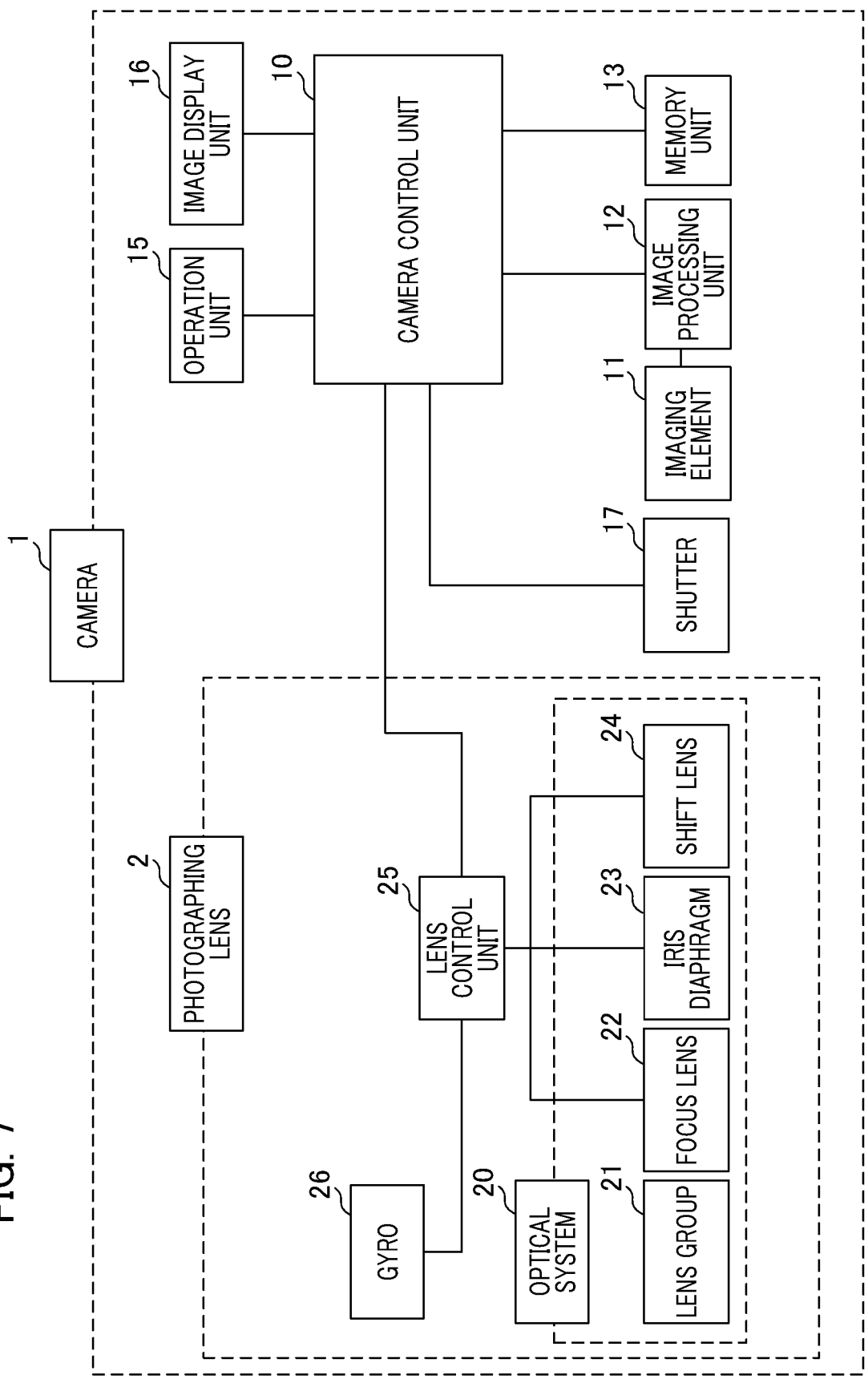
FIG. 7 is a block diagram which describes a configuration of an imaging apparatus in a second embodiment.

FIG. 7 is a block diagram which shows a configuration example of a digital camera as an imaging apparatus according to the present embodiment. Differences from the first embodiment are that a shutter 17 is provided before the imaging element 11, and a gyro 26 instead of the motion vector detection unit 14 is provided. The gyro 26 is an angular velocity sensor which detects an angular velocity of shaking of the camera 1, and is built into the photographing lens 2. An angular velocity blur signal detected by the gyro 26 is integrated by the lens controller 25 and converted into an angle blur amount. A blur amount on an imaging plane of the imaging element 11 is calculated by adjusting a gain for the angle blur amount.

The influence of noise on the gyro 26 due to shutter driving will be described with reference to FIG. 8. FIG. 8 represents temporal change in an angular velocity blur signal detected by the gyro 26, the horizontal axis is a time axis, and the vertical axis represents an angular velocity blur amount. A period T11 is a period before still image exposure, a period T12 is a period during still image exposure, and a period T13 is a period after still image exposure ends.

Figure 8A:
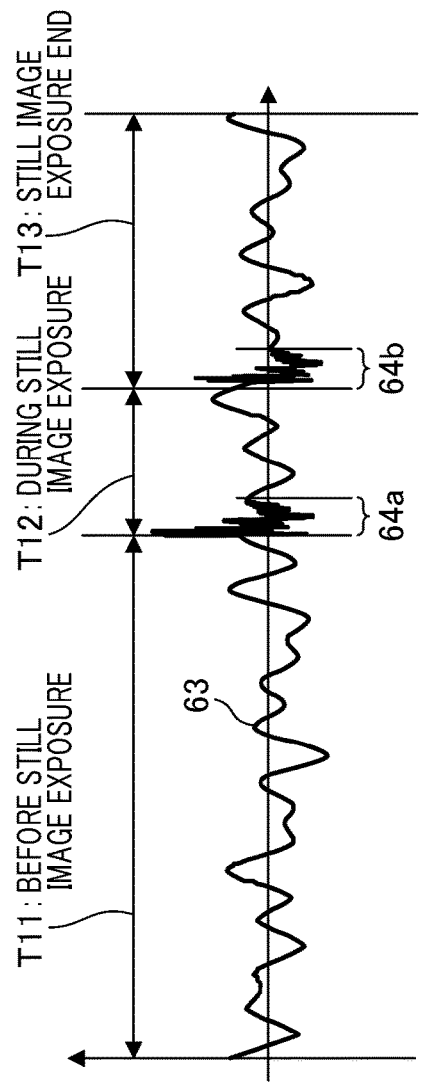
FIGS. 8A and 8B are schematic diagrams which show resetting of a blur signal and a prediction filter in the second embodiment.

FIG. 8 shows how noise 64a is superimposed on a blur signal 63 detected by the gyro 26 at a beginning of the period T12. A cause of the noise 64a is that a front curtain of the shutter 17 which controls exposure start on the image plane of the imaging element 11 travels, and an impact generated at the end of traveling imparts vibration to the gyro 26. In addition, noise 64b is generated at the beginning of the period T13. A cause of the noise 64b is that an impact generated at the time of the end of traveling of a back curtain of the shutter 17 which controls an exposure end imparts vibration to the gyro 26.

In particular, the noise 64a generated in the period T12 influences image blur correction during still image exposure and causes a decrease in image blur correction accuracy. Therefore, in the present embodiment, a blur correction signal in a period in which noise is generated by driving of the shutter 17 is generated by prediction processing for high accuracy in image blur correction. Specific description will be performed below with reference to FIG. 8B.

Next, a calculation operation of a blur signal used for correction and an image blur correction operation will be described with reference to FIG. 9. FIG. 9 is a block diagram of a signal processing unit which calculates a blur signal in the present embodiment. Differences from FIG. 3 are as follows.

Gyro Signal 71

A gyro signal 71 is an angular velocity blur signal detected by the gyro 26, and is output to the HPF 32 and the LPF 33.

A/D Converters 72a and 72b

An A/D converter 72a converts an output signal of the HPF 32 into a digital signal and outputs the converted signal to the high frequency side prediction processing unit 35. In addition, the A/D converter 72b converts an output signal of the LPF 33 into a digital signal and outputs the converted signal to the low frequency side prediction processing unit 36. In the present embodiment, an analog signal of an angular velocity blur amount is detected by the gyro 26. Therefore, the A/D converters 72a and 72b convert respective blur signals band-separated by passing through the HPF 32 and the LPF 33 into digital signals, respectively. In addition, in the case of the present embodiment, the downsampler 34 of FIG. 3 is not necessary, and a sampling frequency (fc) of each of the A/D converter 72a and 72b is changed instead. For example, the sampling frequency fc of the A/D converter 72a is set to 1000 Hz, and the sampling frequency fc of the A/D converter 72b is set to 250 Hz. The up-sampler 37 is disposed after the low frequency side prediction processing unit 36, and a frequency of an output signal of the low frequency side prediction processing unit 36 is converted into the same sampling frequency as that on a high frequency side.

Integrator 73 and Gain Adjuster 74

An angular velocity blur signal which is a superimposed output signal of a high frequency side and a low frequency side obtained by addition by the adder 38 is sent to the integrator 73 and is converted into an angle blur amount. Furthermore, a gain adjuster 74 adjusts a gain and converts the gain into a blur amount on the image plane of the imaging element 11.

Figure 8B:
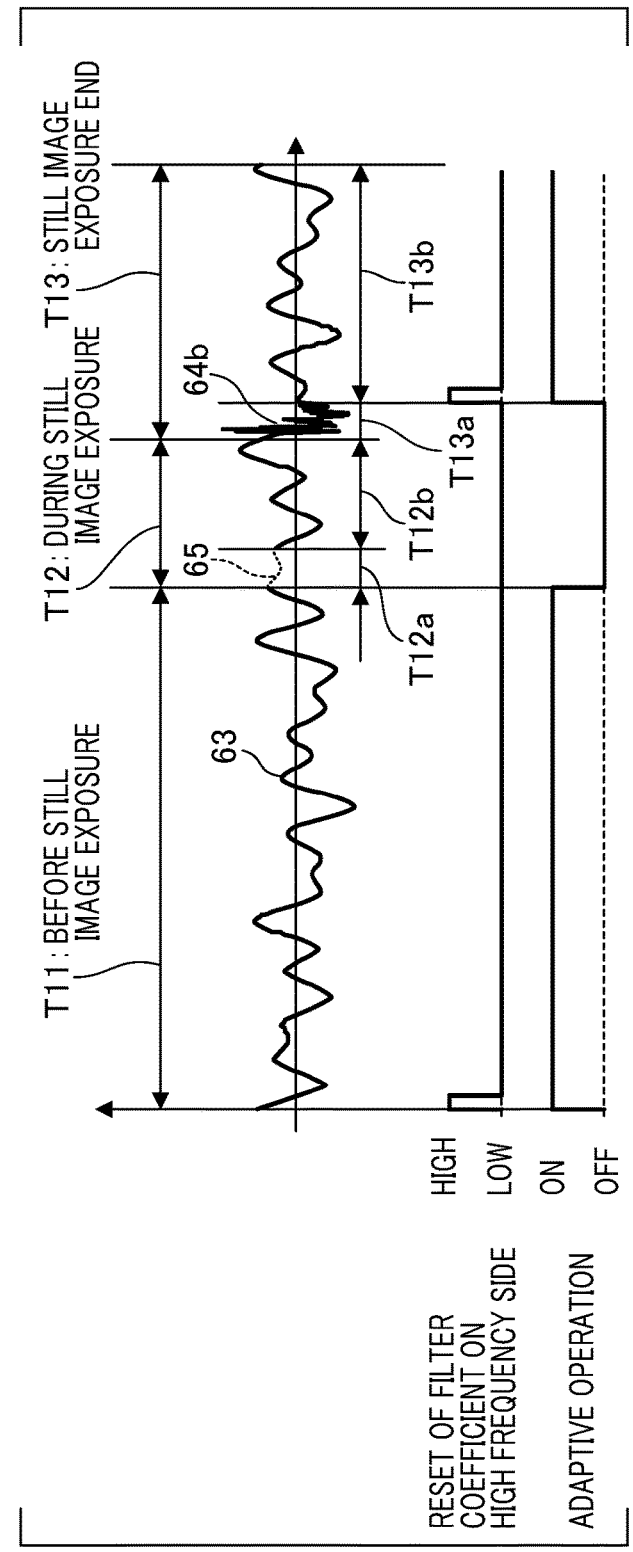
Figure 9:
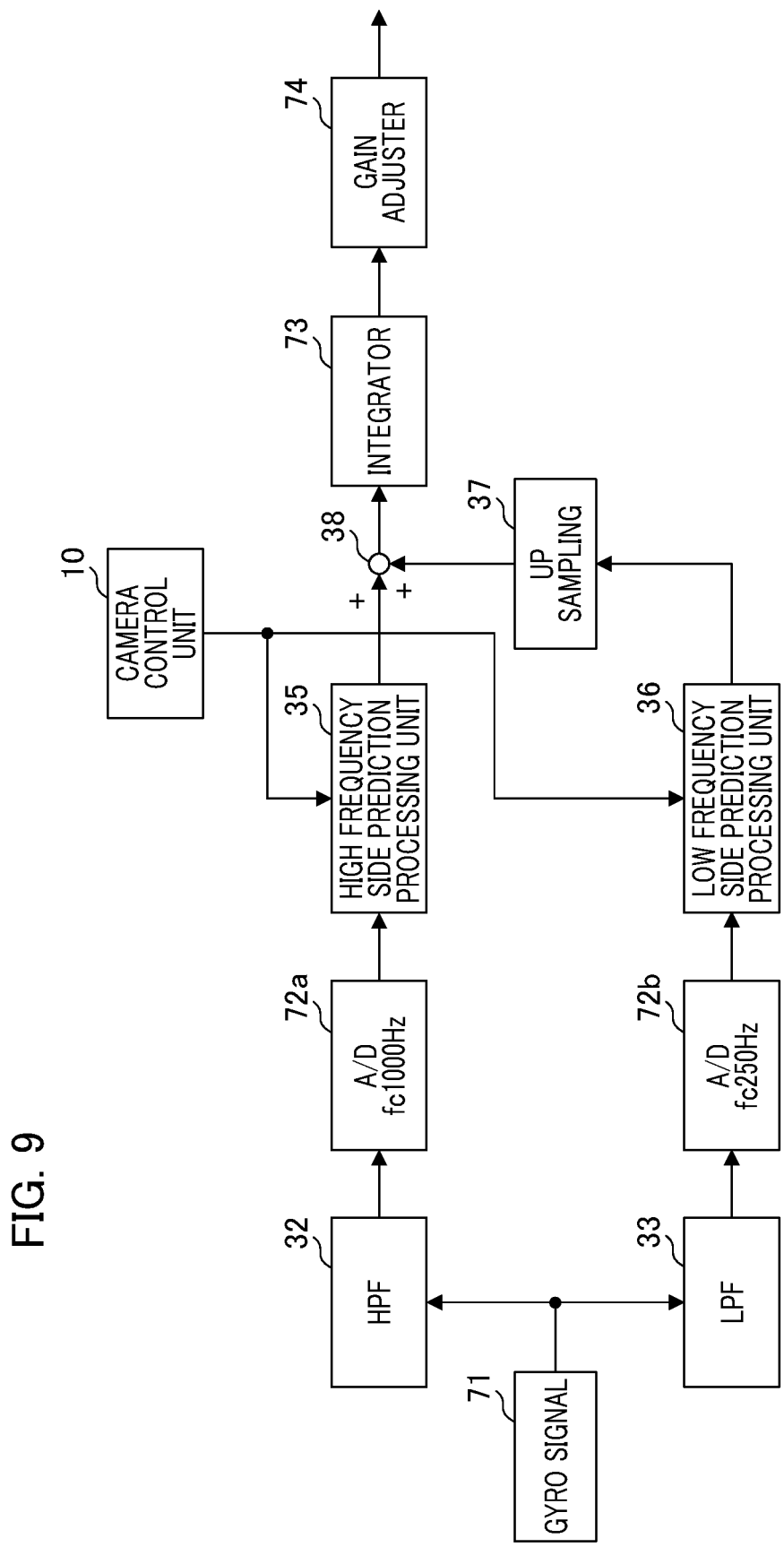
FIG. 9 is a block diagram which shows signal processing in the second embodiment.

Next, a reset timing of the filter coefficient of a prediction filter in a prediction processing unit and a start timing of an adaptive operation will be described with reference to FIG. 8B. A blur signal detected by the gyro 26 and a blur correction signal for the prediction processing unit are shown. Timing charts on a lower side of the graph show a reset timing of the filter coefficient of the high frequency side prediction filter and a timing of an adaptive operation. A solid line 63 represents an angular velocity blur signal by the gyro 26, and a broken line 65 represents a blur signal used for correction by prediction processing.

The filter coefficient of a prediction filter on a high frequency side is reset at the time of the start of blur detection by the gyro 26 in the period T11, and the filter coefficient value of a prediction filter on a low frequency side is set to a filter coefficient value at the time of the end of a previous camera operation. An adaptive operation of each prediction filter is started. Then, if a still image photographing command is issued from the camera control unit 10, the switching units 43 and 46 (FIG. 4) of each of the high frequency side prediction processing unit 35 and the low frequency side prediction processing unit 36 are switched, the adaptive operation stops, and a prediction signal is output.

Furthermore, the shutter 17 is driven in the period T12, and still image exposure is performed. Among the period T12, a period in which noise is generated due to the impact of initial shutter driving is indicated as T12a. In this period T12a, image blur correction is performed using a blur correction signal (broken line 65) generated by a prediction filter. The period T12a is set in advance on the basis of a period in which noise is generated by the impact of shutter driving. In the period T12, a remaining period excluding the period T12a is indicated as T12b. In the period T12b, the output changeover switch 46a shown in FIG. 4 is switched to a state in which the contact point 46c is selected, each prediction processing unit outputs a detection blur signal of the gyro 26, and image blur correction is performed. Thereafter, the still image exposure ends and the noise 64b generated at the end of traveling of the back curtain of the shutter 17 in the period T13 is superimposed on the detection signal of the gyro 26. For this reason, the camera control unit 10 switches the prediction unit input changeover switch 43a to the contact point 43b and causes an adaptive operation to start again after waiting for a period T13a until the noise 64b stops. The filter coefficient of a prediction filter on a high frequency side is reset and the filter coefficient of a prediction filter on a low frequency side is set to a previous filter coefficient value at a timing of the start of an adaptive operation. An adaptive operation of each prediction processing unit is performed in a period T13b excluding the period T13a in the period T13.

In the present embodiment, a gyro sensor and a shutter mechanism are provided, and image blur correction is performed on the basis of a detection signal of the gyro sensor. Even in the case in which noise is superimposed on a gyro signal by an impact due to shutter driving at the time of still image photographing, it is possible to improve image blur correction accuracy. Although noise interference on a gyro signal due to driving of the shutter 17 is illustrated and described, noise generated by an impact at the time of moving a movable mirror of a quick return mirror mechanism up and down in a digital signal lens reflex camera is also able to cause interference.

Third Embodiment

Next, a third embodiment will be described with reference to FIG. 10 and FIG. 11. In the present embodiment, a plurality of prediction filters are provided for each band-separated blur signal. Processing of selecting which to use among blur correction signals using the plurality of prediction filters is performed according to a time from the start time of blur signal detection to the issue of a still image photographing command.

Figure 10:
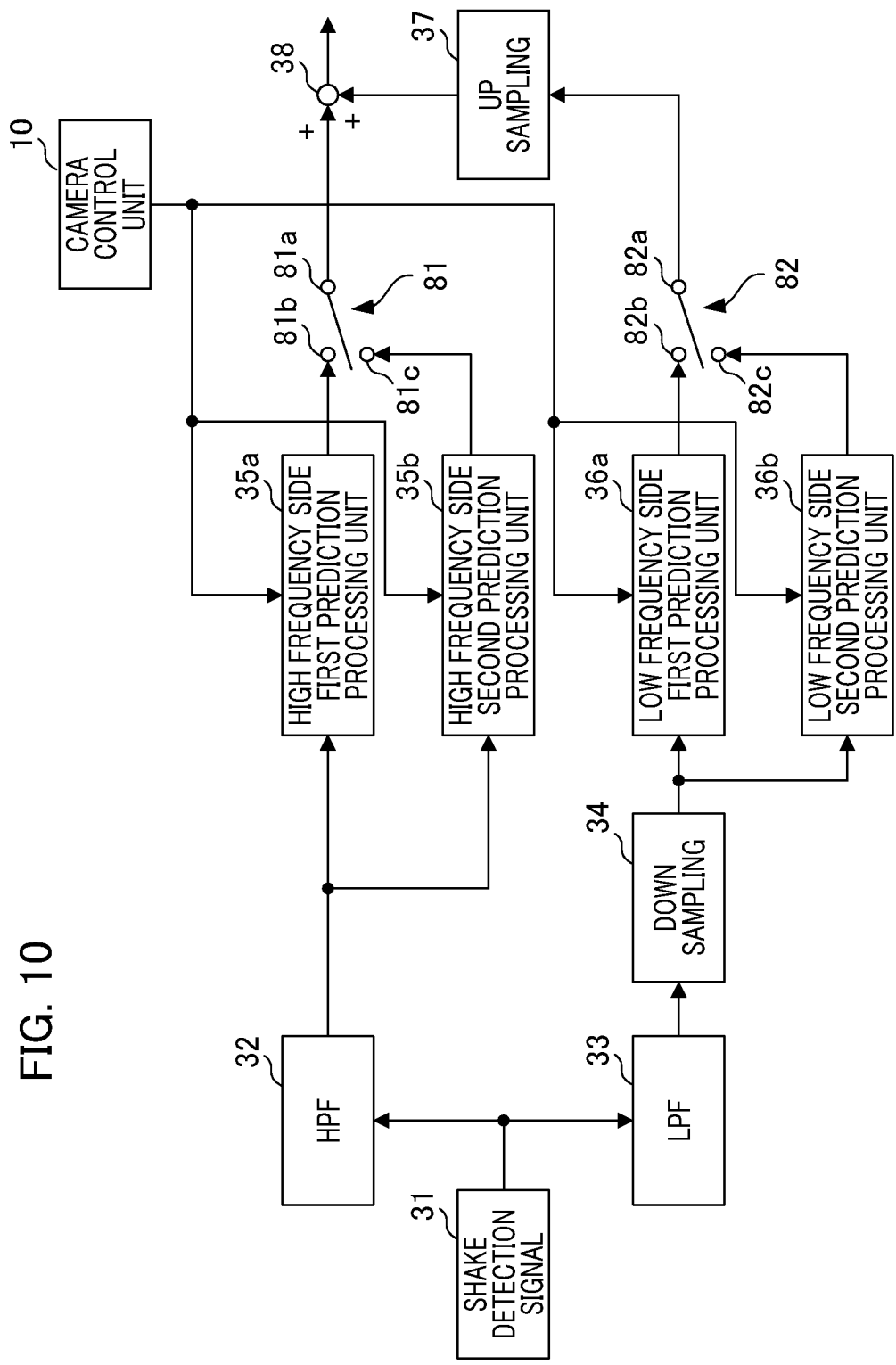
FIG. 10 is a block diagram which shows signal processing in a third embodiment.

With reference to FIG. 10, a calculation operation of a blur signal and a blur correction operation used for correction in the present embodiment will be described. FIG. 10 is a block diagram of a signal processing unit in the present embodiment. Differences from FIG. 3 are as follows.

High Frequency Side First Prediction Processing Unit 35a, High Frequency Side Second Prediction Processing Unit 35b In the present embodiment, two high frequency side prediction processing units are provided and each of the units performs prediction processing by acquiring an output signal of the HPF 32. The high frequency side first prediction processing unit 35a is a first signal prediction unit which performs prediction processing on a high frequency band signal, and the high frequency side second prediction processing unit 35b is a second signal prediction unit which performs prediction processing on a high frequency band signal. The configuration of each prediction processing unit has already been described with reference to FIGS. 4, 5A, and 5B in the first embodiment, and each prediction processing unit independently performs an adaptive operation. A switching unit 81 selects an output of one of the high frequency side prediction processing units in accordance with a command of the camera control unit 10. The output of the high frequency side first prediction processing unit 35a is sent to the adder 38 in a state in which a selection switch 81a selects a terminal 81b, and the output of the high frequency side second prediction processing unit 35b is sent to the adder 38 in a state in which the selection switch 81a selects a terminal 81c.

Low Frequency Side First Prediction Processing Unit 36a, Low Frequency Side Second Prediction Processing Unit 36b In the present embodiment, two low frequency side prediction processing units are provided and each of the units performs prediction processing by acquiring an output signal of the down-sampler 34. The low frequency side first prediction processing unit 36a is a first signal prediction unit which performs prediction processing on a low frequency band signal, and the low frequency side second prediction processing unit 36b is a second signal prediction unit which performs prediction processing on a low frequency band signal. The configuration of each prediction processing unit has already been described with reference to FIGS. 4, 5A, and 5B in the first embodiment, and each prediction processing unit independently performs an adaptive operation. A switching unit 82 selects an output of one of the low frequency side prediction processing units in accordance with a command of the camera control unit 10. The output of the low frequency side first prediction processing unit 36a is sent to the up-sampler 37 in a state in which a selection switch 82a selects a terminal 82b, and the output of the low frequency side second prediction processing unit 36b is sent to the up-sampler 37 in a state in which the selection switch 82a selects a terminal 82c.

Switching Units 81 and 82

During still image exposure, the switching units 81 and 82 receive a command from the camera control unit 10, and switch which predicted blur signal of a plurality of prediction processing units to use.

In the high frequency side first prediction processing unit 35a, like the high frequency side prediction processing unit 35 of the first embodiment, a filter coefficient is reset and set to an initial value whenever the detection of a blur signal starts and each time after still image photographing ends. On the other hand, in the high frequency side second prediction processing unit 35b, like the low frequency side prediction processing unit 36 of the first embodiment, a filter coefficient value previously recorded is set at the start time of an adaptive operation. In the low frequency side first prediction processing unit 36a, a filter coefficient is reset and set to an initial value whenever the detection of a blur signal starts and each time after still image photographing ends. In the low frequency side second prediction processing unit 36b, a filter coefficient previously recorded is set at the start time of an adaptive operation.

Next, with reference to FIG. 11, output switching operations of the plurality of prediction processing units will be described. FIG. 11 shows temporal change in a blur signal detected by the motion vector detection unit 14, and temporal change in a blur correction signal for a prediction processing unit. A period T21 is an adaptive operation period before still image exposure, and T22 is a period during still image exposure. Thereafter, still image exposure is performed in a period T24 after a period T23 of adaptive operation period elapses. Then, still image exposure is performed in a period T26 after a period T25 of adaptive operation period elapses. Graphs of solid lines 61a to 61c represent blur signals for the motion vector detection unit 14, and graphs of broken lines 62a to 62c represent blur correction signals used for correction by prediction processing. Timing charts shown on a lower side of the graphs represent a switch state of the switching unit 81 on a high frequency side and a switch state of the switching unit 82 on a low frequency side. The timing chart of the switching unit 81 on a high frequency side shows a state in which the terminal 81b or 81c is selected by the selection switch 81a. The timing chart of the switching unit 82 on a low frequency side shows a state in which the terminal 82b or 82c is selected by the selection switch 82a.

First, if blur detection starts in the period T21, in each of the high frequency side first prediction processing unit 35a and the low frequency side first prediction processing unit 36a, a filter coefficient is reset and set to an initial value. On the other hand, in each of the high frequency side second prediction processing unit 35b and the low frequency side second prediction processing unit 36b, a filter coefficient previously recorded is set as it is. In the period T21, an adaptive operation is performed using each filter coefficient. In the period T21, the terminal 81b is selected by the selection switch 81a on a high frequency side and the terminal 82b is selected by the selection switch 82a on a low frequency side.

In a next period T22, still image exposure is performed. A photographer instructs the camera control unit 10 to perform photographing using the operation unit 15, and the camera control unit 10 compares a period length of the period T21 with a predetermined threshold time if a still image photographing command is issued. Specifically, a threshold time on a high frequency side is denoted by Th, and a threshold time on a low frequency side is denoted by T1. Two types of threshold times are set in advance and the camera control unit 10 determines whether a length of the adaptive operation period T21 is longer than each of the threshold times Th and T1. In the present embodiment, the threshold time T1 is set to be longer than the threshold time Th (T1>Th). That is, since the filter coefficient of a prediction filter on a high frequency side converges faster than that of a prediction filter on a low frequency side, the threshold time T1 is set to be a longer time than Th. If the length of an adaptive operation period is longer than a threshold time, performing an adaptive operation after a filter coefficient is reset has faster convergence of a filter coefficient and higher prediction accuracy than performing an adaptive operation using a previous filter coefficient. In addition, if the length of an adaptive operation period is equal to or shorter than a threshold time, performing an adaptive operation using a previous filter coefficient has higher prediction accuracy. Therefore, the camera control unit 10 performs control of switching which prediction filter to use according to the length of an adaptive operation period. If the length of an adaptive operation period is too much longer than a threshold time and a sufficient adaptive time is taken, the accuracy of neither prediction filter is changed. In this case, either one may be used.

Figure 11:
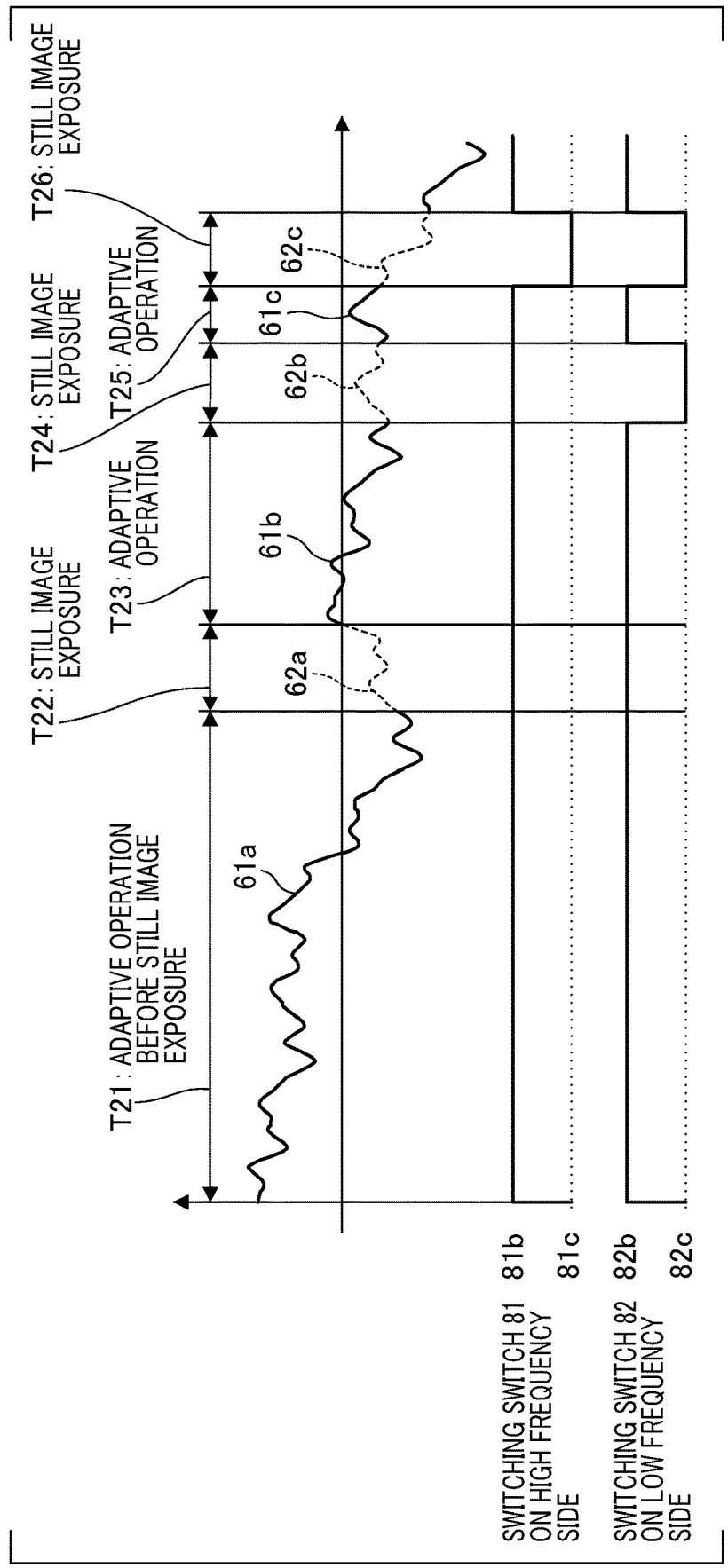
FIG. 11 is a schematic diagram which shows a blur signal and switching operations of a prediction processing unit in the third embodiment.

In an example of FIG. 11, the camera control unit 10 determines whether the period T21 is longer than the threshold time T1 and time for an adaptive operation is sufficient. Therefore, the selection switch 81a selects the terminal 81b, and the selection switch 82 selects the terminal 82b. As a result, the output of the high frequency side first prediction processing unit 35a is sent to the adder 38, and the output of the low frequency side first prediction processing unit 36a is sent to the adder 38 via the up-sampler 37. In the period T23 after still image exposure has ended in the period T22, filter coefficients of the high frequency side first prediction processing unit 35a and the low frequency side first prediction processing unit 36a are reset, and an adaptive operation of each prediction processing unit starts again.

Next, if a still image photographing command is issued again, the camera control unit 10 compares a length of the period T23 with the threshold times Th and T1. In the example of FIG. 11, it is determined that the length of the period T23 is shorter than the threshold time T1, and is longer than the threshold time Th. In this case, a state of the switching unit 81 on a high frequency side remains unchanged as it is, and the terminal 82c side is selected by the selection switch 82a on a low frequency side. As a result, the output of the high frequency side first prediction processing unit 35a is sent to the adder 38 in the period T24, and the output of the low frequency side second prediction processing unit 36b is sent to the adder 38 via the up-sampler 37. The image blur correction is performed using the superimposed sum output by the adder 38.

In the period T25 after still image exposure has ended in the period T24, a state is switched to a state in which the terminal 82b is selected by the selection switch 82a on a low frequency side. Each filter coefficient is set in the same manner as in the period T23, and an adaptive operation starts again.

Next, if a still image photographing command is issued again, the camera control unit 10 compares a length of the period T25 with the threshold times Th and T1. There may be a state in which the period T25 is too short and the time for an adaptive operation is not sufficient even on a high frequency side. The camera control unit 10 then determines that a length of the adaptive operation period is shorter than the threshold time Th. As a result, the state is switched to a state in which the terminal 81c is selected by the selection switch 81a on a high frequency side and the terminal 82c is selected by the selection switch 82a on a low frequency side. The output of the high frequency side second prediction processing unit 35b is sent to the adder 38 and the output of the low frequency side second prediction processing unit 36b is sent to the adder 38 via the up-sampler 37 in the period T26. The image blur correction is performed using a superimposed output signal from the adder 38.

In the present embodiment, control of comparing the length of an adaptive operation period with the threshold time and selecting whether to use an output signal of the first prediction processing unit or an output signal of the second prediction processing unit is performed based on a result of the comparison. The output signal of the first prediction processing unit is a signal of the prediction processing unit which resets a filter coefficient every time, and the output signal of the second prediction processing unit is a signal of the prediction processing unit which performs an adaptive operation using a previous filter coefficient. According to the present embodiment, even if the length of an adaptive operation period from the start time of blur detection to the issue of a still image photographing command is very short, it is possible to perform the image blur correction while reducing a decrease in prediction accuracy. If the length of an adaptive operation period exceeds the threshold time, the second prediction processing unit necessarily does not have better prediction accuracy, and this is probabilistic.

Theoretically, as described above, an adaptive operation period requires time including at least one cycle portion corresponding to a desired frequency, but it is desirable to take the time for an adaptive operation corresponding to several cycles, considering the influence of noise and the like. The threshold times T1 and Th are set on the basis of multiple factors.

Modification of the Third Embodiment

In the third embodiment, control of selecting one of a plurality of prediction processing units in accordance with the time for an adaptive operation and of using a predicted blur signal has been described in the third embodiment, but other methods may also be used. As described using FIGS. 4, 5A, and 5B, each prediction filter at the time of an adaptive operation calculates a prediction processing error e(n) based on a difference between an observation value u(n) and a predicted value y(n). If this prediction processing error e(n) is small, or if small values continue successively, this indicates that a filter coefficient value may converge faster and prediction accuracy may be higher. Therefore, if a still image photographing command is issued, the camera control unit 10 in the modification acquires and compares prediction processing errors e(n) immediately before from two prediction processing units in respective frequency bands. The camera control unit 10 controls the switching units 81 and 82 such that a predicted blur signal from a prediction processing unit with the smaller prediction processing error e(n) immediately before is used for image blur correction during still image exposure.

In the embodiments and modifications, configuration examples in which two prediction processing units are disposed for each band and one is selected are described, but three or more prediction processing units may be disposed for each band as necessary. Alternatively, a plurality of prediction processing units may be disposed in a predetermined band and a single prediction processing unit may be disposed in other bands.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-044967 filed on Mar. 9, 2017, which are hereby incorporated by reference herein in its entirety.

What is claimed is:

1. An image blur correction device that corrects an image blur of an object image by using an image blur correction unit, the object image being imaged by an imaging unit through an imaging optical system, the image blur correction device comprising:
 a memory; and
 a processor operating in accordance with a program stored in the memory,
 wherein the processor functions as:
  a bandwidth separation unit which acquires a detection signal of a blur by a detection unit and separates it into a plurality of frequency band components;
  a plurality of signal prediction units configured to each include a prediction filter, to update a filter coefficient using a signal whose band is separated by the bandwidth separation unit and to perform prediction processing on the detection signal for each separated band;
  a superimposition unit configured to generate a superimposed output signal by superimposing output signals of the plurality of signal prediction units; and
  a control unit configured to control the plurality of signal prediction units and to control the image blur correction unit by calculating a blur amount based on the detection signal or the superimposed output signal,
 wherein the bandwidth separation unit includes a first bandwidth separation unit which separates a high frequency band signal component from the detection signal and a second bandwidth separation unit which separates a low frequency band signal component from the detection signal,
 wherein a first signal prediction unit, among the plurality of signal prediction units, updates a filter coefficient for performing signal prediction using the high frequency band signal, and a second signal prediction unit updates a filter coefficient for performing signal prediction using the low frequency band signal, and
 wherein the control unit resets filter coefficients of the plurality of signal prediction units to initial values at different timings.

2. The image blur correction device according to claim 1, wherein the control unit resets a filter coefficient of the first signal prediction unit whenever acquisition of the detection signal starts, and sets a value at the time of previous update processing having been performed to a filter coefficient of the second signal prediction unit.

3. The image blur correction device according to claim 2, wherein the control unit resets a filter coefficient of the first signal prediction unit at a beginning of an adaptive operation period in which the filter coefficient is updated.

4. The image blur correction device according to claim 3, wherein the first signal prediction unit does not perform signal prediction when a length of the adaptive operation period is shorter than a threshold time.

5. The image blur correction device according to claim 1, wherein the processor further functions as:
 a state detection unit configured to detect a change in state of the image blur correction device, and
 wherein the control unit resets a filter coefficient of one of the plurality of signal prediction units to an initial value when it is detected that the state of the image blur correction device has changed to a predetermined state by the state detection unit.

6. The image blur correction device according to claim 5, wherein the state detection unit includes an acceleration sensor or a touch sensor.

7. The image blur correction device according to claim 1, wherein the first or the second signal prediction unit includes a plurality of prediction processing units, and the control unit performs control of selecting one of outputs of the plurality of prediction processing units using a switching unit and outputting it to the superimposition unit.

8. The image blur correction device according to claim 7, wherein the control unit resets a filter coefficient of a first prediction processing unit, among the plurality of prediction processing units, whenever acquisition of the detection signal starts, and sets a value at the time of previous update processing having been performed to a filter coefficient of a second prediction processing unit.

9. The image blur correction device according to claim 8, wherein the control unit performs control of comparing errors between respective prediction signals in the first and second prediction processing units and the detection signal, and switching the prediction signal of a prediction processing unit having a smaller error.

10. An optical apparatus comprising an image blur correction device that corrects an image blur of an object image by using an image blur correction unit, the object image being imaged by an imaging unit through an imaging optical system, the image blur correction device comprising:

a memory; and a processor operating in accordance with a program stored in the memory, wherein the processor functions as:

a bandwidth separation unit which acquires a detection signal of a blur by a detection unit and separates it into a plurality of frequency band components;

a plurality of signal prediction units configured to each include a prediction filter, to update a filter coefficient using a signal whose band is separated by the bandwidth separation unit, and to perform prediction processing on the detection signal for each separated band;

a superimposition unit configured to generate a superimposed output signal by superimposing output signals of the plurality of signal prediction units; and a control unit configured to control the plurality of signal prediction units and to control the image blur correction unit by calculating a blur amount based on the detection signal or the superimposed output signal, wherein the bandwidth separation unit includes a first bandwidth separation unit which separates a high frequency band signal component from the detection signal and a second bandwidth separation unit which separates a low frequency band signal component from the detection signal, wherein a first signal prediction unit, among the plurality of signal prediction units, updates a filter coefficient for performing signal prediction using the high frequency band signal, and a second signal prediction unit updates a filter coefficient for performing signal prediction using the low frequency band signal, and wherein the control unit resets filter coefficients of the plurality of signal prediction units to initial values at different timings.

11. The optical apparatus according to claim 10, wherein the processor further functions as:

the detection unit configured to detect an angular velocity of blurs; and a drive unit configured to drive an optical member, and wherein the control unit controls the image blur correction unit by calculating a blur amount based on the superimposed output signal in a period in which the optical member is driven by the drive unit.

12. The optical apparatus according to claim 11, wherein the optical member is a shutter or a movable mirror.

13. The optical apparatus according to claim 10, wherein the processor further functions as:

a state detection unit configured to detect a change in state of the optical apparatus, and wherein the reset operation is performed when a change in posture or gripping state of the optical apparatus is detected by the state detection unit.

14. A control method executed by an image blur correction device that corrects an image blur of an object image by using an image blur correction unit, the object image being imaged by an imaging unit through an imaging optical system, the control method comprising:

detecting, by a detection unit, shaking;

acquiring, by a bandwidth separation unit, a detection signal of a blur by the detection unit and separating it into a plurality of frequency band components;

updating, by a plurality of signal prediction units, a filter coefficient of a prediction filter using a signal whose band is separated and performing prediction processing on the detection signal for each separated band;

generating, by a superimposition unit, a superimposed output signal by superimposing output signals of the plurality of signal prediction units; and controlling, by a control unit, the plurality of signal prediction units and controlling the image blur correction unit by calculating a blur amount based on the detection signal or the superimposed output signal, and resetting, by the control unit, filter coefficients of the plurality of signal prediction units to initial values at different timings, wherein the bandwidth separation unit includes a first bandwidth separation unit which separates a high frequency band signal component from the detection signal and a second bandwidth separation unit which separates a low frequency band signal component from the detection signal, and wherein a filter coefficient for performing signal prediction using the high frequency band signal is updated by the first signal prediction unit, among the plurality of signal prediction units, and a filter coefficient for performing signal prediction using the low frequency band signal is updated by the second signal prediction unit.

* * * * *